(12) United States Patent
Kim et al.

(10) Patent No.: US 7,528,927 B2
(45) Date of Patent: May 5, 2009

(54) FABRICATION METHOD OF LIQUID CRYSTAL DISPLAY PANEL AND SEAL PATTERN FORMING DEVICE USING THE SAME

(75) Inventors: Jeong-Rok Kim, Gyungsangbuk-Do (KR); Kyung-Kyu Kang, Gyungsangnam-Do (KR); Johann Jung, Gyungsangbuk-Do (KR); Myung-Woo Nam, Gyungsangbuk-Do (KR); Jae-Deuk Shin, Busan (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/007,799

(22) Filed: Jan. 15, 2008

(65) Prior Publication Data

US 2008/0129949 A1    Jun. 5, 2008

Related U.S. Application Data

(62) Division of application No. 10/698,471, filed on Nov. 3, 2001, now Pat. No. 7,342,639.

(30) Foreign Application Priority Data

Dec. 30, 2002   (KR)   ................ 10-2002-0087395

(51) Int. Cl.
*G02F 1/1339*   (2006.01)

(52) U.S. Cl. ..................... 349/190; 349/153

(58) Field of Classification Search ............... 349/190, 349/153
See application file for complete search history.

(56) References Cited

U.S. PATENT DOCUMENTS

| | | |
|---|---|---|
| 3,978,580 A | 9/1976 | Leupp et al. |
| 4,094,058 A | 6/1978 | Yasutake et al. |
| 4,653,864 A | 3/1987 | Baron et al. |
| 4,691,995 A | 9/1987 | Yamazaki et al. |
| 4,775,225 A | 10/1988 | Tsuboyama et al. |
| 5,247,377 A | 9/1993 | Omeis et al. |
| 5,263,888 A | 11/1993 | Ishihara et al. |
| 5,379,139 A | 1/1995 | Sato et al. |
| 5,406,989 A | 4/1995 | Abe |
| 5,499,128 A | 3/1996 | Hasegawa et al. |
| 5,507,323 A | 4/1996 | Abe |

(Continued)

FOREIGN PATENT DOCUMENTS

CN    1095823    11/1994

(Continued)

OTHER PUBLICATIONS

Yaodong Cui, "Silicon Cutting Arrangement System 2.0 version and Analysis of Its Material-saving Effect", Medium and Mini Type Motor, 23(5).

*Primary Examiner*—David Nelms
*Assistant Examiner*—David Y Chung
(74) *Attorney, Agent, or Firm*—McKenna Long & Aldridge LLP

(57) ABSTRACT

A method of fabricating a liquid crystal display (LCD) panel, and a seal pattern forming device used in fabricating the same, applies both seal dispensing and screen printing techniques to form seal patterns of variously sized LCD panels formed on the same base substrate.

10 Claims, 4 Drawing Sheets

U.S. PATENT DOCUMENTS

| | | |
|---|---|---|
| 5,511,591 A | 4/1996 | Abe |
| 5,539,545 A | 7/1996 | Shimizu et al. |
| 5,548,429 A | 8/1996 | Tsujita |
| 5,642,214 A | 6/1997 | Ishii et al. |
| 5,680,189 A | 10/1997 | Shimizu et al. |
| 5,742,370 A | 4/1998 | Kim et al. |
| 5,757,451 A | 5/1998 | Miyazaki et al. |
| 5,802,970 A | 9/1998 | Tani |
| 5,852,484 A | 12/1998 | Inoue et al. |
| 5,854,664 A | 12/1998 | Inoue et al. |
| 5,861,932 A | 1/1999 | Inata et al. |
| 5,875,922 A | 3/1999 | Chastine et al. |
| 5,893,625 A | 4/1999 | Tamatani et al. |
| 5,952,676 A | 9/1999 | Sato et al. |
| 5,956,112 A | 9/1999 | Fujimori et al. |
| 6,001,203 A | 12/1999 | Yamada et al. |
| 6,011,609 A | 1/2000 | Kato et al. |
| 6,016,178 A | 1/2000 | Kataoka et al. |
| 6,016,181 A | 1/2000 | Shimada |
| 6,055,035 A | 4/2000 | von Gutfeld et al. |
| 6,163,357 A | 12/2000 | Nakamura |
| 6,219,126 B1 | 4/2001 | von Gutfeld |
| 6,222,603 B1 | 4/2001 | Sakai et al. |
| 6,226,067 B1 | 5/2001 | Nishiguchi et al. |
| 6,236,445 B1 | 5/2001 | Foschaar et al. |
| 6,304,306 B1 | 10/2001 | Shiomi et al. |
| 6,304,311 B1 | 10/2001 | Egami et al. |
| 6,337,730 B1 | 1/2002 | Ozaki et al. |
| 6,414,733 B1 | 7/2002 | Ishikawa et al. |
| 6,573,972 B2 | 6/2003 | Sasaki |
| 6,593,992 B1 | 7/2003 | Chin et al. |
| 6,825,910 B2 | 11/2004 | Aoki et al. |
| 2001/0004281 A1 * | 6/2001 | Sasaki ........................ 349/190 |
| 2001/0021000 A1 | 9/2001 | Egami |

FOREIGN PATENT DOCUMENTS

| | | |
|---|---|---|
| CN | 1321911 | 11/2001 |
| EP | 1 003 066 A1 A1 | 5/2000 |
| JP | 51-065656 | 6/1976 |
| JP | 57-038414 A1 | 3/1982 |
| JP | 57-088428 A1 | 6/1982 |
| JP | 58-027126 A1 | 2/1983 |
| JP | 59-057221 | 4/1984 |
| JP | 59-195222 | 11/1984 |
| JP | 60-111221 | 6/1985 |
| JP | 60-164723 A1 | 8/1985 |
| JP | 60-217343 A1 | 10/1985 |
| JP | 61-007822 A1 | 1/1986 |
| JP | 61-055625 A1 | 3/1986 |
| JP | 62-089025 A1 | 4/1987 |
| JP | 62-090622 A1 | 4/1987 |
| JP | 62-205319 A1 | 9/1987 |
| JP | 63-109413 A1 | 5/1988 |
| JP | 63-110425 A1 | 5/1988 |
| JP | 63-128315 A1 | 5/1988 |
| JP | 63-311233 A1 | 12/1988 |
| JP | 3023419 | 1/1991 |
| JP | 4242720 | 8/1992 |
| JP | 05-127179 A1 | 5/1993 |
| JP | 05-154923 | 6/1993 |
| JP | 05-265011 A1 | 10/1993 |
| JP | 05-281557 A1 | 10/1993 |
| JP | 05-281562 A1 | 10/1993 |
| JP | 05-303067 | 11/1993 |
| JP | 06-051256 A1 | 2/1994 |
| JP | 06-148657 A1 | 5/1994 |
| JP | 06-160871 | 6/1994 |
| JP | 06-235925 | 8/1994 |
| JP | 06-265915 A1 | 9/1994 |
| JP | 06-313870 | 11/1994 |
| JP | 07-084268 | 3/1995 |
| JP | 07-128674 A1 | 5/1995 |
| JP | 07-181507 A1 | 7/1995 |
| JP | 08-095066 A1 | 4/1996 |
| JP | 08-101395 | 4/1996 |
| JP | 08-106101 A1 | 4/1996 |
| JP | 08-171094 A1 | 7/1996 |
| JP | 08-190099 A1 | 7/1996 |
| JP | 08-240807 A1 | 9/1996 |
| JP | 09-005762 A1 | 1/1997 |
| JP | 09-026578 A1 | 1/1997 |
| JP | 09-061829 | 3/1997 |
| JP | 09-073075 A1 | 3/1997 |
| JP | 09-073096 A1 | 3/1997 |
| JP | 09-127528 A1 | 5/1997 |
| JP | 09-230357 A1 | 9/1997 |
| JP | 09-281511 A1 | 10/1997 |
| JP | 09-285110 | 10/1997 |
| JP | 09-311340 A1 | 12/1997 |
| JP | 10107289 | 4/1998 |
| JP | 10-123537 | 5/1998 |
| JP | 10-123537 A1 | 5/1998 |
| JP | 10-123538 A1 | 5/1998 |
| JP | 10-142616 A1 | 5/1998 |
| JP | 10-177178 | 6/1998 |
| JP | 10-221700 A1 | 8/1998 |
| JP | 10-282512 A1 | 10/1998 |
| JP | 10-333157 | 12/1998 |
| JP | 10-333159 | 12/1998 |
| JP | 11-014953 A1 | 1/1999 |
| JP | 11-038424 A1 | 2/1999 |
| JP | 11-064811 A1 | 3/1999 |
| JP | 11-109388 A1 | 4/1999 |
| JP | 11-133438 | 5/1999 |
| JP | 11-142864 | 5/1999 |
| JP | 11-174477 A1 | 7/1999 |
| JP | 11-212045 A1 | 8/1999 |
| JP | 11-248930 | 9/1999 |
| JP | 11-326922 | 11/1999 |
| JP | 11-344714 A1 | 12/1999 |
| JP | 2000-002879 | 1/2000 |
| JP | 2000-029035 | 1/2000 |
| JP | 2000-056311 | 2/2000 |
| JP | 2000-066165 | 3/2000 |
| JP | 2000-137235 | 5/2000 |
| JP | 2000-147528 | 5/2000 |
| JP | 2000171768 | 6/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-005401 | 1/2001 |
| JP | 2001-005405 | 1/2001 |
| JP | 2001-013506 | 1/2001 |
| JP | 2001000907 | 1/2001 |
| JP | 2001-033793 | 2/2001 |
| JP | 2001-042341 | 2/2001 |
| JP | 2001-051284 | 2/2001 |
| JP | 2001-066615 | 3/2001 |
| JP | 2001-091727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |
| JP | 2001-142074 | 5/2001 |
| JP | 2001-147437 | 5/2001 |
| JP | 2001-154211 | 6/2001 |
| JP | 2001-166272 | 6/2001 |
| JP | 2001-166310 | 6/2001 |

| | | | | | | |
|---|---|---|---|---|---|---|
| JP | 2001-183683 | | 7/2001 | JP | 2002-014360 A1 | 1/2002 |
| JP | 2001-209052 | | 8/2001 | JP | 2002-023176 A1 | 1/2002 |
| JP | 2001-209060 | | 8/2001 | JP | 2002-049045 A1 | 2/2002 |
| JP | 2001-222017 | | 8/2001 | JP | 2002-082340 A1 | 3/2002 |
| JP | 2001-235758 | | 8/2001 | JP | 2002-090759 A1 | 3/2002 |
| JP | 2001-215459 | | 9/2001 | JP | 2002-090760 A1 | 3/2002 |
| JP | 2001-255542 | | 9/2001 | JP | 2002-107740 A1 | 4/2002 |
| JP | 2001-264782 | | 9/2001 | JP | 2002-122872 A1 | 4/2002 |
| JP | 2001-201750 | | 10/2001 | JP | 2002-122873 A1 | 4/2002 |
| JP | 2001-272640 | | 10/2001 | JP | 2002-139734 | 5/2002 |
| JP | 2001-281675 | | 10/2001 | JP | 2002-202512 A1 | 7/2002 |
| JP | 2001-281678 | | 10/2001 | JP | 2002-202514 A1 | 7/2002 |
| JP | 2001-282126 | | 10/2001 | JP | 2002-214626 A1 | 7/2002 |
| JP | 2001-305563 | | 10/2001 | JP | 2002258299 | 9/2002 |
| JP | 2001-330837 | | 11/2001 | JP | 2002-350876 | 12/2002 |
| JP | 2001-330840 | A1 | 11/2001 | KR | 2000-035302 A1 | 6/2000 |
| JP | 2001-356353 | | 12/2001 | | | |
| JP | 2001-356354 | A1 | 12/2001 | * cited by examiner | | |

FABRICATION METHOD OF LIQUID CRYSTAL DISPLAY PANEL AND SEAL PATTERN FORMING DEVICE USING THE SAME

This application is a divisional application based on U.S. patent application Ser. No. 10/698,471, filed on Nov. 3, 2003 now U.S. Pat. No. 7,342,639, which claims the benefit of Korean Patent Application No. 2002-87395, filed on Dec. 30, 2002, all of which are hereby incorporated by reference for all purposes as if fully set forth herein. This application incorporates by reference two co-pending applications, Ser. No. 10/184,096, filed on Jun. 28, 2002, entitled "SYSTEM AND METHOD FOR MANUFACTURING LIQUID CRYSTAL DISPLAY DEVICES" and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME", as if fully set forth herein.

BACKGROUND OF THE INVENTION

1. Field of the Invention

The present invention relates to liquid crystal display (LCD) panels. More particularly, the present invention relates to a method of forming seal patterns on the same base substrate for a plurality of LCD panels and a seal pattern forming device for forming the same.

2. Description of the Related Art

Generally, liquid crystal display (LCD) panels are fabricated by forming a thin film transistor (TFT) substrate in a TFT process; forming a color filter substrate in a color filter process, different from the TFT process; performing coating and rubbing processes to form alignment layers on the TFT array and color filter substrates; printing a seal pattern on the TFT array substrate, providing a spacer on the color filter substrate; attaching the TFT array substrate to the color filter substrate via the printed seal pattern, wherein the spacer maintains a uniform cell gap between attached substrates; and injecting a liquid crystal between the attached TFT and color filter substrates. Moreover, a short is provided to connect a common electrode terminal of the color filter substrate to a bonding pad of the TFT array substrate.

To improve the productivity in which LCD panels such as those described above are fabricated, a plurality of unit substrates of a single type (e.g., TFT array substrates or color filter substrates) can be formed on a first base substrate. Subsequently, a complementary base substrate, on which is formed a plurality of complementary unit substrates of a single type (e.g. e.g., color filter substrates or TFT array substrates, respectively), is attached to the first base substrate. Accordingly, a plurality of unit LCD panels are simultaneously formed by attaching the first base substrate to the complementary base substrate.

FIG. 1 illustrates a plan view of a plurality of first unit LCD panels formed on a base substrate, wherein the plurality of first unit LCD panels have a first size. FIG. 2 illustrates a plan view of a plurality of second unit LCD panels formed on a base substrate, wherein the plurality of second unit LCD panels have a second size, greater than the first size.

Referring to FIG. 1, six first-type unit LCD panels 110 having a first size are formed using the same base substrate 100 and are spaced apart from each other by predetermined distances. Referring to FIG. 2, however, only three second-type unit LCD panels 120 having a second size, greater than the first size, can be formed using the same base substrate 100 as shown in FIG. 1. Accordingly, when the second-type unit LCD panels 120 are formed using the base substrate 100, a portion of the base substrate 100 cannot be used to fabricate more second-type unit LCD panels. As illustrated above, the efficiency with which a base substrate 100 can be used decreases as the size of the unit LCD panels formed on the base substrate 100 increase. Accordingly, the productivity of fabricating unit LCD panels decreases while the cost of fabricating the unit LCD panels increases.

SUMMARY OF THE INVENTION

Accordingly, the present invention is directed to a method of fabricating liquid crystal display (LCD) panels that substantially obviates one or more of the problems due to limitations and disadvantages of the related art.

An advantage of the present invention provides a method of maximizing the efficiency with which a base substrate is used while fabricating LCD panels.

Another advantage of the present invention provides a method of forming seal patterns and a seal pattern forming device capable of increasing the productivity at which LCD panels are fabricated.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a method for fabricating an LCD panel may, for example, include providing a base substrate; forming at least one first image display region within a first panel region of the base substrate; forming at least one second image display region within a second panel region of the base substrate, wherein the at least one second image region is smaller than the at least one first image display region; forming at least one first seal pattern at a periphery of at least one first image display region by a first forming method; and forming at least one second seal pattern at a periphery of at least one second image display region by a second forming method.

According to principles of another aspect of the present invention, a seal pattern forming device used in fabricating an LCD panel may, for example, include a first seal pattern former forming at least one first seal pattern on a first panel region of a base substrate by a first forming method; and a second seal pattern former forming at least one second seal pattern on a second panel region of the base substrate by a second forming method.

According to the principles of the present invention, the efficiency with which a base substrate is used in fabricating LCD panels may be maximized because LCD panels having different sizes are formed on the same base substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 3:
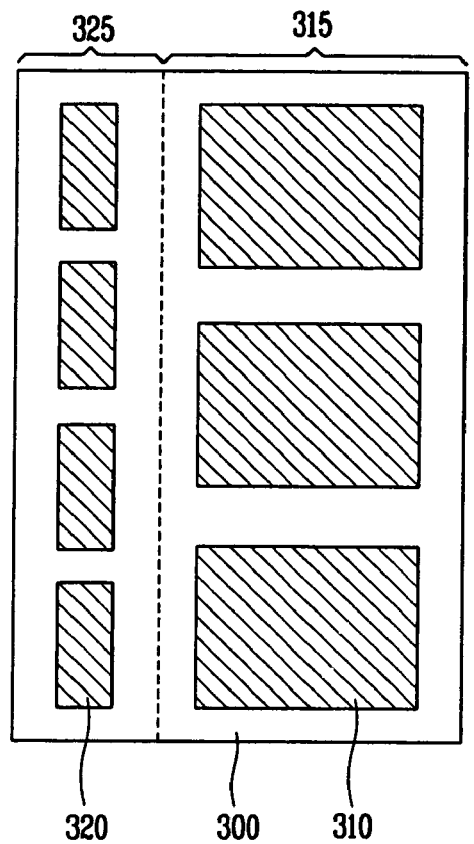
FIG. 3 illustrates a plan view of a plurality of LCD panels having different sizes formed on the same base substrate in accordance with principles of the present invention.

FIG. 3 illustrates a plan view of a plurality of LCD panels having different sizes formed on the same base substrate in accordance with principles of the present invention.

According to principles of the present invention, a plurality of unit liquid crystal display (LCD) panels having different sizes may be simultaneously formed by fabricating unit substrates of a single type (e.g., TFT array substrates or color filter substrates) on the same base substrate.

For example, a base substrate 300 may be divided into a first panel region 315 and a second panel region 325. In one aspect of the present invention, at least one first image display region 310 may be formed within the first panel region 315 and at least one second image display region 320 may be formed within the second panel region 325, wherein the at least one first image display region 310 may be larger than the at least one second image display region 320. In another aspect of the present invention, each of the first and second image display regions 310 and 320, respectively, may be separated from each other by a predetermined distance to facilitate the execution of various LCD panel fabrication processes.

According to principles of the present invention, the first and second image display regions 310 and 320 may be provided as unit TFT array substrates or unit color filter substrates. In one aspect of the present invention, the first and second image display regions 310 and 320 may be attached to complementary image display regions (not shown) to form a plurality of unit LCD panels. For example, if the first and second image display regions 310 and 320 are provided as TFT array substrates, the complementary image display regions may be provided as suitably dimensioned color filter substrates. Alternatively, if the first and second image display regions 310 and 320 are provided as color filter substrates, the complementary image display regions may be provided as suitably dimensioned TFT array substrates. In one aspect of the present invention, the complementary image display regions may be formed on a complementary base substrate (not shown). In another aspect of the present invention, the complementary image display regions may be oriented within the complementary base substrate so as to be substantially aligned with corresponding ones of the first and second image display regions 310 and 320 upon attaching the base substrate 300 with the complementary base substrate.

Figure 1:
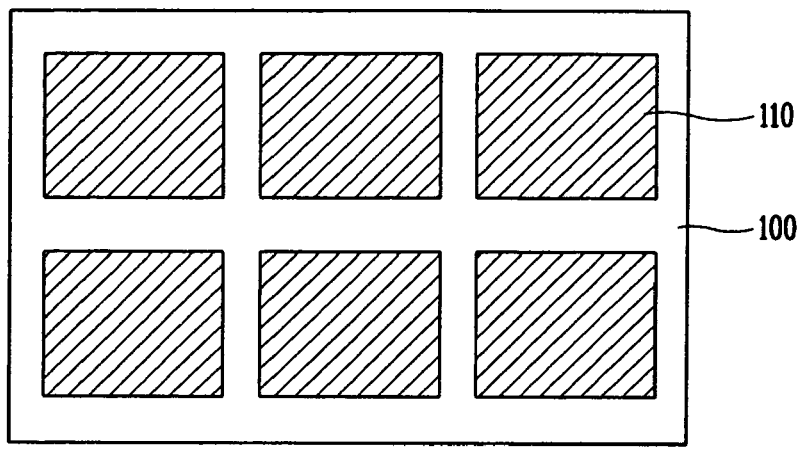
FIG. 1 illustrates a plan view of a plurality of first-type unit LCD panels formed on a base substrate, wherein the plurality of first-type unit LCD panels have a first size.
Figure 2:
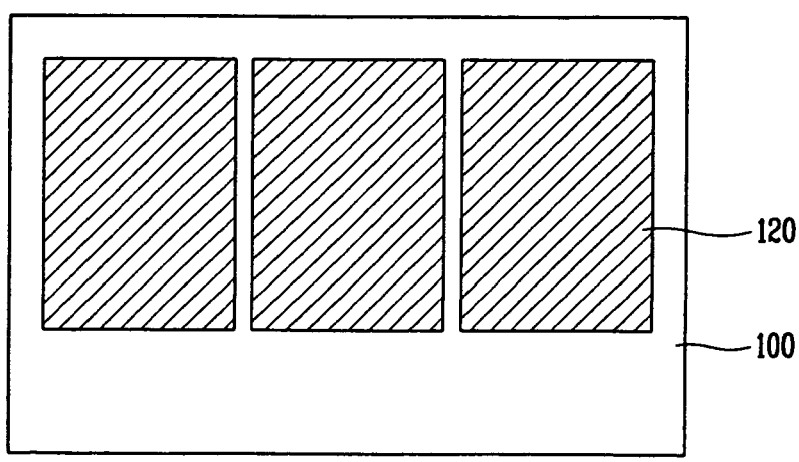
FIG. 2 illustrates a plan view of a plurality of second-type unit LCD panels formed on the base substrate shown in FIG. 1, wherein the plurality of second-type unit LCD panels have a second size, greater than the first size.

Referring still to FIG. 3, when first and second image display regions 310 and 320 are formed within the first and second panel regions 315 and 325, respectively, of the same base substrate 300, the efficiency with which the base substrate 300 is used may be increased compared to the efficiency with which the base substrate 100, shown in FIG. 1 or 2, is used while forming unit LCD panels.

In accordance with principles of the present invention, substantially any number of image display regions of substantially any size may be formed on the same base substrate to maximize the number of LCD panels that may be formed using a single base substrate. For example, the base substrate may simultaneously support four first image display regions, four second image display regions and two first image display regions, six second image display regions and one first image display region, two second image display regions, etc.

A method of forming seal patterns for the aforementioned first and second image display regions will now be described in greater detail below.

Figure 4:
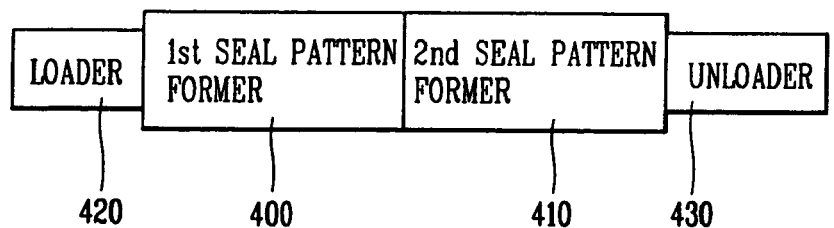
FIG. 4 illustrates a block diagram of a seal pattern forming device in accordance with principles of the present invention, wherein the seal pattern forming device is used in forming seal patterns.

FIG. 4 illustrates a block diagram of a seal pattern forming device in accordance with principles of the present invention, wherein the seal pattern forming device is used in forming seal patterns.

Referring to FIG. 4, a seal pattern forming device may, for example, include a loader 420 for arranging a base substrate operably proximate a first seal pattern former 400; a second seal pattern former 410 capable of receiving the base substrate from the first seal pattern former 400; and an unloader 430 for unloading the base substrate, on which the first and second seal patterns are formed, from the second seal pattern former 410. In one aspect of the present invention, the first seal pattern former 400 may form a first seal pattern around each first image display region 310. In another aspect of the present invention, the second seal pattern former 410 may form a second seal pattern around each second image display region 320.

In still another aspect of the present invention, the arrangement of the first and second seal pattern formers 400 and 410, respectively, may be transposed such that the loader 420 may arrange a base substrate operably proximate the second seal pattern former 410, the first seal pattern former 400 may receive the base substrate from the second seal pattern former 410, and the unloader 430 may unload the base substrate from the first seal pattern former 400.

In yet another aspect of the present invention, the first seal pattern former 400 may form at least one first seal pattern on the base substrate according to a seal dispensing method while the second seal pattern former 410 may form at least one second seal pattern on the base substrate according to a screen forming method. In still a further aspect of the present invention, the first seal pattern former 400 may simultaneously form a plurality of first seal patterns according to a seal dispensing method while the second seal pattern former 410 may simultaneously form a plurality of seal patterns according to a screen printing method.

Figure 5:
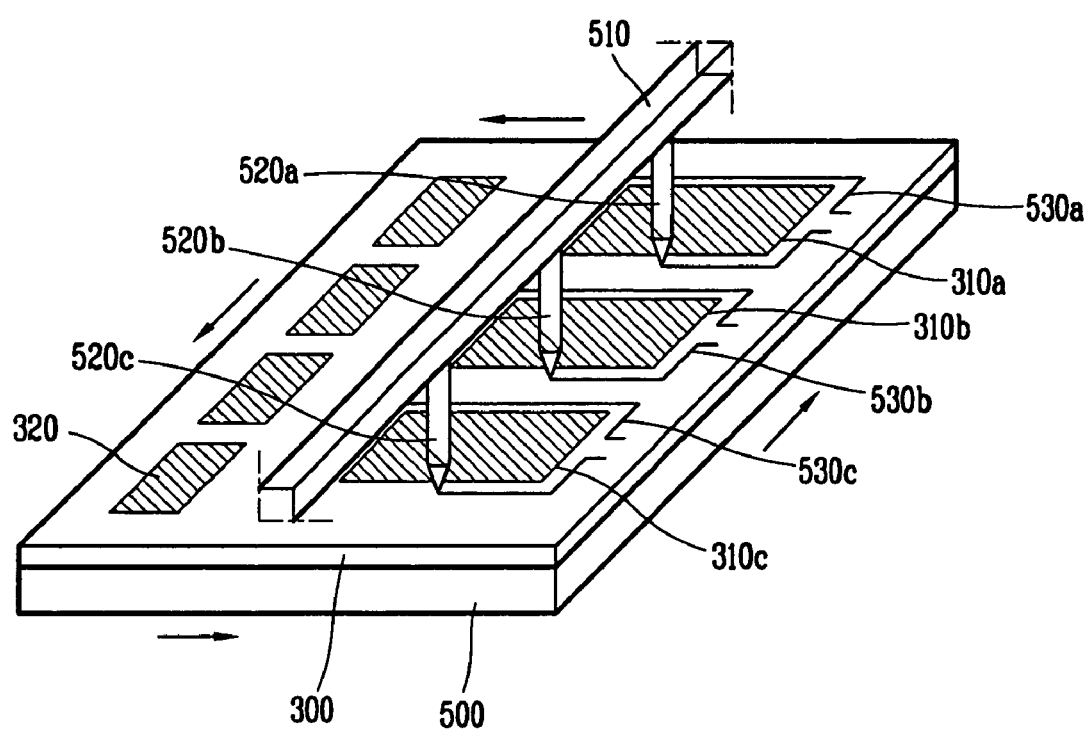
FIG. 5 illustrates a schematic view of the first seal pattern former shown in FIG. 4 forming a first seal pattern by a seal dispensing method.

FIG. 5 illustrates a schematic view of the first seal pattern former shown in FIG. 4 forming a first seal pattern by a seal dispensing method.

Referring to FIG. 5, the first seal pattern former 400 may, for example, include a first table 500 for supporting the base substrate 300 and a plurality of sealant dispensers 520a-c fixed to a support 510 arranged over the first table 500.

In one aspect of the present invention, the sealant dispensers 520a-c may be spaced apart from each other by a predetermined distance on the support 510, wherein the predetermined distance corresponds to the distance like regions of first image display regions 310a-c are spaced apart from each other within the first panel region 315 of the base substrate 300. In another aspect of the present invention, the sealant dispensers 520a-c may be provided with small, circular or rectangular-shaped, nozzles through which sealant material may be selectively dispensed directly onto the base substrate 300.

According to principles of the present invention, the base substrate 300 may be mounted on the first table 500 via the loader 420. Further, first sealant patterns 530a-c may be formed at a periphery of corresponding ones of the first image display regions 310a-c by moving at least one of the first table 500 and the support 510 while selectively dispensing sealant material through nozzles of the sealant dispensers 520a-c. In one aspect of the present invention, first seal patterns 530a-c may be formed at a periphery of corresponding ones of the first image display regions 310a-c by moving the support 510 in front, rear, left, and right directions to move sealant dispensers 520a-c, in unison, relative to the first table 500. In another aspect of the present invention, first seal patterns 530a-c may be formed at a periphery of corresponding ones of the first image display regions 310a-c by moving the first table 500, supporting the base substrate 300, in front, rear, left, and right directions relative to the sealant dispensers 520a-c fixed to the support 510.

In one aspect of the present invention, the number of sealant dispensers fixed to the support 510 may be equal to the number of first image display regions on the base substrate 300. In another aspect of the present invention, the number of the sealant dispensers fixed to the support 510 may be less than or greater than the number of first image display regions formed on the base substrate 300. Accordingly, when the number of sealant dispensers is less than or greater than the number of first image display regions, some sealant dispensers fixed to the support 510 may not dispense sealant material while others may. For example, if the first seal pattern former 400 includes three sealant dispensers and only two first image display regions are formed on the base substrate 300, the nozzle of one sealant dispenser may be cut off such that sealant material is not dispensed by that sealant dispenser. In still another aspect of the present invention, the number of first image display regions may be a multiple of the number of sealant dispensers. Accordingly, the sealant dispensers need not be cut off while forming the first sealant patterns.

By forming seal patterns according to the aforementioned seal dispensing method, consumption of sealant material may be minimized by selectively dispensing sealant directly onto the base substrate 300 at a periphery of the first image display regions 310a-c, thereby simultaneously forming a plurality of first seal patterns 530a-c. Further, by forming seal patterns according to the aforementioned seal dispensing method, the alignment direction provided by an alignment layer formed in the image display region may be prevented from becoming damaged. Still further, the plurality of sealant dispensers 520a-c may be prevented from contacting the first image display regions 310a-c while forming the seal patterns. Accordingly, a picture quality of subsequently formed unit LCD panels may be improved.

Figure 6A:
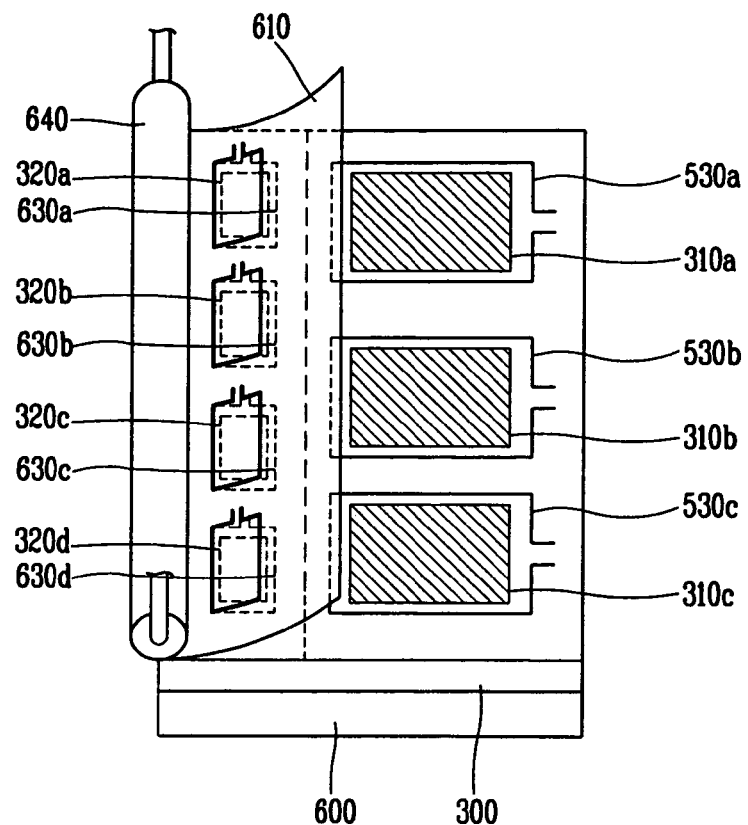
FIGS. 6A and 6B illustrate schematic views of the second seal pattern former shown in FIG. 4 forming a second seal pattern by a screen printing method.
Figure 6B:
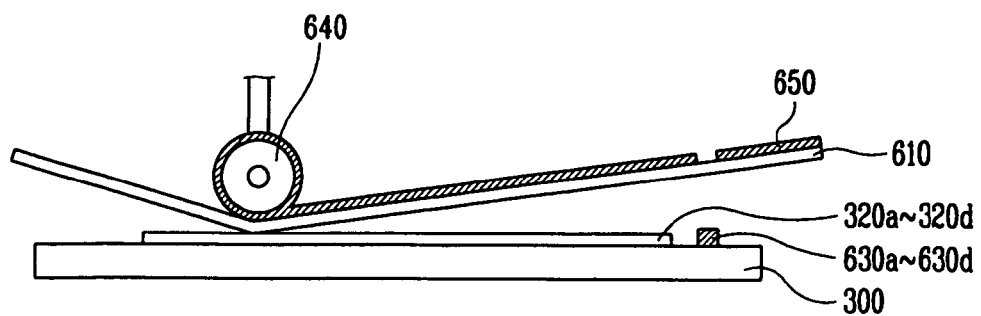

FIGS. 6A and 6B illustrate schematic views of the second seal pattern former shown in FIG. 4 forming a second seal pattern by a screen printing method.

Referring to FIGS. 6A and 6B, the second seal pattern former 410 may, for example, include a second table 600 for supporting the base substrate 300; a screen mask 610 for selectively exposing a periphery of second image display regions 320a-d on the base substrate 300; and a roller 640 for applying sealant material 650, disposed over the screen mask, through the screen mask 610 onto the base substrate 300, thereby simultaneously forming a plurality of second seal patterns 630a-d at a periphery of second image display regions 320a-d, respectively.

In one aspect of the present invention, the sealant material 650 may comprise a thermosetting sealant material. In another aspect of the present invention, at least one spacer (not shown) may be formed within each second image display region 320a-d in the same screen printing process used to form the plurality of second seal patterns 630a-d. According to the principles of the present invention, the spacers may be provided for maintaining a cell gap between subsequently attached base substrate 300 and complementary base substrate (not shown). After the plurality of second seal patterns 630a-d (and spacers) are formed on the base substrate 300, a drying process may be performed to evaporate solvent from within the sealant material 650. The drying process may also level the plurality of first and second seal patterns (and spacers) to ensure that the thickness and height of the sealant material structures are substantially uniform. If the seal patterns are not substantially uniform, a cell gap cannot be formed uniformly after hardening the seal pattern.

By forming seal patterns according to the aforementioned screen printing method, a plurality of seal patterns may be formed on a substrate easily and efficiently. However, by coating sealant material 650 onto screen mask 610, the screen printing method consumes a larger amount of sealant material compared to the aforementioned seal dispensing method. Further, by forming seal patterns according to the aforementioned screen printing method, the screen mask 610 may contact the base substrate 300 and possibly damage the alignment direction provided by an alignment layer formed in the image display region. Accordingly, forming seal patterns by the aforementioned screen printing method may not be desirable in fabricating large-sized LCD panels such as unit LCD panels formed in the first panel region 315 of the base substrate 300 but is suitable in fabricating LCD panels such as unit LCD panels formed in the second panel region 320 of the base substrate.

If the second seal patterns are formed using the same first seal pattern former used to form the first seal patterns, only one sealant dispenser could be used to form the second seal patterns because the sealant dispensers were fixed on the support in correspondence with the dimensions of the first image display regions. Accordingly, when different-sized seal patterns are formed using the same seal pattern formers (e.g., the first seal pattern former), fabrication time is increased and productivity is lowered because only one type of seal pattern (e.g., the first seal pattern) may be efficiently formed using a single type of seal pattern former (e.g., the first seal pattern former) that performs a specific seal pattern forming process (e.g., a seal dispensing process). Therefore, and in accordance with the principles of the present invention, fabrication time may be decreased and productivity may be raised by forming different-sized seal patterns using different seal pattern formers (e.g., forming the second seal pattern according to the screen printing method via the second seal pattern former while forming the first seal pattern according to the seal dispensing method via the first seal pattern former).

As shown in FIGS. 5 and 6, the first seal patterns 530a-c and the second seal patterns 630a-d may maintain a substantially uniform cell gap between subsequently attached substrates and to prevent subsequently provided liquid crystal material from seeping out of the first image display regions 310a-c and the second image display regions 320a-d.

In one aspect of the present invention, the first and second seal patterns 530a-c and 630a-d, respectively, formed at the periphery of the first image display regions 310a-c and 530a-d, respectively, may define and liquid crystal injection holes 400 formed at one side thereof. Accordingly, after the unit substrates are attached to complementary unit substrates, liquid crystal material may be injected through the injection holes 400 and into the cell gap. In another aspect of the present invention, however, the first and second seal patterns 530a-c and 630a-d, respectively, may be formed at the periphery of the first image display regions 310a-c and 530a-d, respectively, may be provided in a closed pattern, without the liquid crystal injection holes 400. Accordingly, liquid crystal material may be dispensed directly onto a unit substrate and subsequently attached to a complementary unit substrate upon fabricating unit LCD panels.

After seal patterns are formed at a periphery of each image display region of the base substrate 300, the base substrate 300 may be attached to a complementary base substrate (not shown), wherein the complementary base substrate includes complementary image display regions corresponding in number and orientation to the image display regions formed within the first and second panel regions 315 and 325. During the attaching process, the two base substrates may be aligned with respect to each other, the complementary base substrate may contact the seal patterns, and the seal patterns may then be hardened. In one aspect of the present invention, the cell gap should be uniformly maintained during the hardening. Accordingly, the seal pattern may be formed from thermosetting material and hardened using a hot press method. In one aspect of the present invention, the seal pattern may be formed from a material that is hardened upon exposure to UV light. In another aspect of the present invention, the UV curable sealant material may include a thermosetting sealant. In still another aspect of the present invention, the seal pattern may be hardened using a heating method and a UV curing method.

After the base substrate 300 is attached to the complementary base substrate, scribe and break processes may be performed to complete fabrication of the unit LCD panels. During the scribe process, for example, a diamond-tipped pen or wheel may be used to form groove in the surface of the base substrate 300. During the break process, for example, unit LCD panels formed as a result of the attaching process are separated from each other from within the attached base substrates. Accordingly, a plurality of LCD panels having different sizes may be fabricated from the same base substrates.

As described above, unit LCD panels of two different sizes may be simultaneously formed within the same base substrate using, at least in part, the first and second seal pattern formers. According to principles of the present invention, however, a plurality of unit LCD panels of substantially any size may be simultaneously formed within the same base substrate by providing the first seal pattern former, the second seal pattern former, and other seal pattern formers, within the seal pattern forming device shown in FIG. 4. For example, the seal pattern forming device may include a plurality of seal pattern formers capable of forming seal patterns according to the seal dispensing method, a plurality of seal pattern formers capable of forming seal patterns according to the screen printing method, and the like. In one aspect of the present invention, each seal pattern former may comprise at least one screen mask, sealant dispenser, etc., configured to form a seal pattern for a image display region of a predetermined size and orientation within a base substrate.

The principles of the present invention are advantageous because LCD panels having a plurality of different sizes may be formed within the same base substrate, thereby increasing the efficiency with which the base substrate by minimizing the area of the base substrate that is not used. Moreover, by forming seal patterns using diverse, in-line, seal pattern formers, productivity of LCD panel fabrication may be improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

The invention claimed is:

1. A method of fabricating a liquid crystal display (LCD) panel, comprising:
   providing a base substrate;
   forming at least one first image display region within a first panel region of the base substrate;
   forming at least one second image display region within a second panel region of the base substrate, wherein the at least one second image display region is smaller than the at least one first image display region, and wherein the second panel region is smaller than the first panel region;
   forming at least one first seal pattern at a periphery of at least one first image display region by a seal dispensing method; and
   forming at least one second seal pattern at a periphery of at least one second image display region by a screen printing method.

2. The method of claim 1, wherein the first and second image display regions comprise TFT array substrates.

3. The method of claim 1, wherein the first and second image display regions comprise color filter substrates.

4. The method of claim 1, wherein forming at least one first seal pattern comprises forming a plurality of first seal patterns.

5. The method of claim 4, further comprising forming the plurality of first seal patterns simultaneously.

6. The method of claim 1, wherein forming at least one second seal pattern comprises forming a plurality of first seal patterns.

7. The method of claim 6, further comprising forming the plurality of second seal patterns simultaneously.

8. The method of claim 1, further comprising forming at least one second seal pattern after forming at least one first seal pattern.

9. The method of claim 1, further comprising forming at least one first seal pattern after forming at least one second seal pattern.

10. A seal pattern forming device of a liquid crystal display (LCD) panel, comprising:
    a first seal pattern former forming at least one first seal pattern on at least one first image display region within a first panel region of a base substrate by a seal dispensing method; and
    a second seal pattern former forming at least one second seal pattern on at least one second image display region within a second panel region of the base substrate by a screen printing method,
    wherein a size of the second panel region is smaller than the first panel region, and a size of the second image display region is smaller than the first image display region.

* * * * *